(12) United States Patent
Toda et al.

(10) Patent No.: US 11,890,811 B2
(45) Date of Patent: Feb. 6, 2024

(54) THREE-DIMENSIONAL SHAPING APPARATUS AND THREE-DIMENSIONAL SHAPED ARTICLE PRODUCTION METHOD

(71) Applicant: Seiko Epson Corporation, Tokyo (JP)

(72) Inventors: Riona Toda, Shiojiri (JP); Kenta Anegawa, Matsumoto (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/560,387

(22) Filed: Dec. 23, 2021

(65) Prior Publication Data

US 2022/0203620 A1 Jun. 30, 2022

(30) Foreign Application Priority Data

Dec. 24, 2020 (JP) ................. 2020-214756

(51) Int. Cl.
*B29C 64/336* (2017.01)
*B29C 64/236* (2017.01)
(Continued)

(52) U.S. Cl.
CPC ............ *B29C 64/336* (2017.08); *B22F 10/18* (2021.01); *B22F 10/85* (2021.01); *B22F 12/53* (2021.01);
(Continued)

(58) Field of Classification Search
CPC .......... B22F 10/18; B22F 10/85; B22F 12/53; B22F 12/57; B22F 12/58; B29C 64/118;
(Continued)

(56) References Cited

U.S. PATENT DOCUMENTS 2,871,516 A 2/1959 Sherman et al.
4,107,246 A * 8/1978 LaSpisa ............... G05D 7/0605
264/40.7
(Continued)

FOREIGN PATENT DOCUMENTS

CN 103878979 A 6/2014
CN 104290325 A 1/2015
(Continued)

*Primary Examiner* — Joseph S Del Sole
*Assistant Examiner* — John Robitaille
(74) *Attorney, Agent, or Firm* — Harness, Dickey & Pierce, P.L.C.

(57) ABSTRACT

A three-dimensional shaping apparatus includes a plasticizing section, a stage, an ejection section having a first nozzle and a second nozzle, each of which communicates with the plasticizing section, a first ejection adjusting section, a second ejection adjusting section, a moving section that relatively moves the ejection section with respect to the stage, and a control unit. The control unit performs a switching process for switching from a first state in which the ejection of the plasticized material from the first nozzle is stopped and the plasticized material is ejected from the second nozzle to a second state in which the plasticized material is ejected from the first nozzle and the second nozzle by controlling the first ejection adjusting section and the second ejection adjusting section, and an ejection amount decreasing process for decreasing the ejection amount of the plasticized material from the second nozzle by controlling the screw or the second ejection adjusting section before switching from the first state to the second state.

8 Claims, 10 Drawing Sheets

(51) Int. Cl.
| | |
|---|---|
| *B29C 64/209* | (2017.01) |
| *B29C 64/343* | (2017.01) |
| *B29C 64/295* | (2017.01) |
| *B29C 64/314* | (2017.01) |
| *B33Y 50/02* | (2015.01) |
| *B22F 12/53* | (2021.01) |
| *B29C 64/118* | (2017.01) |
| *B29C 64/393* | (2017.01) |
| *B22F 10/85* | (2021.01) |
| *B22F 10/18* | (2021.01) |
| *B33Y 30/00* | (2015.01) |
| *B33Y 10/00* | (2015.01) |

(52) U.S. Cl.
CPC .......... *B29C 64/118* (2017.08); *B29C 64/209* (2017.08); *B29C 64/236* (2017.08); *B29C 64/295* (2017.08); *B29C 64/314* (2017.08); *B29C 64/343* (2017.08); *B29C 64/393* (2017.08); *B33Y 50/02* (2014.12); *B33Y 10/00* (2014.12); *B33Y 30/00* (2014.12)

(58) Field of Classification Search
CPC ... B29C 64/209; B29C 64/245; B29C 64/295; B29C 64/314; B29C 64/336; B29C 64/343; B29C 64/393; B33Y 30/00
See application file for complete search history.

(56) References Cited

U.S. PATENT DOCUMENTS

| | | | |
|---|---|---|---|
| 4,721,589 A | 1/1988 | Harris | |
| 5,121,329 A | 6/1992 | Crump | |
| 5,260,009 A | 11/1993 | Penn | |
| 5,303,141 A | 4/1994 | Batchelder et al. | |
| 5,340,433 A | 8/1994 | Crump | |
| 5,402,351 A | 3/1995 | Batchelder et al. | |
| 5,633,021 A * | 5/1997 | Brown | B29C 41/36 |
| | | | 425/375 |
| 5,747,077 A * | 5/1998 | Yoshida | B29C 48/49 |
| | | | 425/185 |
| 6,019,916 A * | 2/2000 | Mizuguchi | B29C 48/2725 |
| | | | 425/185 |
| 6,401,001 B1 | 6/2002 | Jang et al. | |
| 6,578,596 B1 | 6/2003 | Batchelder et al. | |
| 7,874,825 B2 | 1/2011 | Khoshnevis | |
| 10,254,499 B1 | 4/2019 | Cohen et al. | |
| 10,981,332 B2 | 4/2021 | Chanclon et al. | |
| 11,034,087 B2 | 6/2021 | Saito et al. | |
| 11,077,619 B2 | 8/2021 | Yuwaki et al. | |
| 11,161,297 B2 | 11/2021 | Tyler et al. | |
| 11,413,809 B2 | 8/2022 | Hashimoto et al. | |
| 11,446,865 B2 | 9/2022 | Streicher et al. | |
| 2005/0015171 A1 | 1/2005 | Cruz-Uribe et al. | |
| 2005/0015175 A1 | 1/2005 | Huang | |
| 2007/0138678 A1* | 6/2007 | Khoshnevis | E04B 1/3505 |
| | | | 52/561 |
| 2013/0141491 A1 | 6/2013 | Krichtman et al. | |
| 2014/0252668 A1 | 9/2014 | Austin et al. | |
| 2016/0046073 A1 | 2/2016 | Hadas | |
| 2016/0082653 A1 | 3/2016 | Ohnishi | |
| 2017/0008230 A1 | 1/2017 | Yuyama | |
| 2017/0157820 A1 | 6/2017 | Ward et al. | |
| 2017/0157831 A1 | 6/2017 | Mandel et al. | |
| 2017/0157844 A1 | 6/2017 | Mandel et al. | |
| 2017/0203506 A1 | 7/2017 | Hjelsand et al. | |
| 2017/0203507 A1 | 7/2017 | Leavitt et al. | |
| 2017/0210069 A1* | 7/2017 | Stubenruss | B29C 48/92 |
| 2017/0210074 A1 | 7/2017 | Ueda et al. | |
| 2017/0232681 A1 | 8/2017 | Xu et al. | |
| 2017/0291364 A1 | 10/2017 | Womer | |
| 2017/0297107 A1 | 10/2017 | Oka et al. | |
| 2018/0169941 A1 | 6/2018 | Taniguchi et al. | |
| 2018/0200955 A1 | 7/2018 | Hoelldorfer et al. | |
| 2018/0311894 A1 | 11/2018 | Saito et al. | |
| 2018/0326657 A1 | 11/2018 | Iwase | |
| 2018/0348247 A1 | 12/2018 | Ando | |
| 2019/0022934 A1 | 1/2019 | Kobe et al. | |
| 2019/0022940 A1 | 1/2019 | Hofmann et al. | |
| 2019/0030811 A1 | 1/2019 | Gasso et al. | |
| 2019/0030820 A1 | 1/2019 | Saito et al. | |
| 2019/0061243 A1 | 2/2019 | Saito et al. | |
| 2019/0076924 A1 | 3/2019 | Jepeal et al. | |
| 2019/0168446 A1 | 6/2019 | Leibig et al. | |
| 2019/0217546 A1 | 7/2019 | Bosveld et al. | |
| 2019/0315114 A1 | 10/2019 | Hjelsand et al. | |
| 2019/0375003 A1 | 12/2019 | Mark | |
| 2020/0016833 A1* | 1/2020 | Yuwaki | B33Y 30/00 |
| 2020/0016834 A1* | 1/2020 | Yuwaki | B33Y 30/00 |
| 2020/0094479 A1* | 3/2020 | Yamasaki | B33Y 40/10 |
| 2020/0094480 A1* | 3/2020 | Yamasaki | B29C 64/245 |
| 2020/0164575 A1* | 5/2020 | Yuwaki | B29C 64/209 |
| 2020/0198240 A1* | 6/2020 | Hashimoto | B29C 64/393 |
| 2020/0207017 A1* | 7/2020 | Yuwaki | B29C 64/209 |
| 2020/0230942 A1 | 7/2020 | Gasso et al. | |
| 2020/0269515 A1* | 8/2020 | Takahashi | B29C 64/118 |
| 2020/0406548 A1* | 12/2020 | Yuwaki | B29C 64/245 |
| 2021/0039306 A1 | 2/2021 | Busbee | |
| 2021/0154910 A1 | 5/2021 | Cheng et al. | |
| 2021/0162663 A1 | 6/2021 | Saito et al. | |
| 2021/0206065 A1 | 7/2021 | Saito et al. | |
| 2021/0387410 A1 | 12/2021 | Moore et al. | |
| 2021/0402687 A1* | 12/2021 | Anegawa | B29C 59/14 |
| 2022/0032536 A1* | 2/2022 | Anegawa | B29C 64/232 |
| 2022/0118524 A1 | 4/2022 | Nakamura et al. | |
| 2022/0134438 A1* | 5/2022 | Yamazaki | B29C 64/106 |
| | | | 264/308 |
| 2022/0234280 A1 | 7/2022 | Hashimoto et al. | |

FOREIGN PATENT DOCUMENTS

| | | |
|---|---|---|
| CN | 204622625 U | 9/2015 |
| CN | 105172143 A | 12/2015 |
| CN | 105291442 A | 2/2016 |
| CN | 106573405 A | 4/2017 |
| CN | 106853683 A | 6/2017 |
| CN | 107336435 A | 11/2017 |
| CN | 108790155 A | 11/2018 |
| CN | 109421269 A | 3/2019 |
| CN | 109605745 A | 4/2019 |
| EP | 3437837 A1 | 2/2019 |
| JP | H03-158228 A | 7/1991 |
| JP | H05-345359 A | 12/1993 |
| JP | H06-179243 A | 6/1994 |
| JP | H07-096534 A | 4/1995 |
| JP | H11-042712 A | 2/1999 |
| JP | 2000-246780 A | 9/2000 |
| JP | 2005-344765 A | 12/2005 |
| JP | 2006-192710 A | 7/2006 |
| JP | 2010-241016 A | 10/2010 |
| JP | 2015-502870 A | 1/2015 |
| JP | 2015-148309 A | 8/2015 |
| JP | 2015-200879 A | 11/2015 |
| JP | 2016-064539 A | 4/2016 |
| JP | 2017-013351 A | 1/2017 |
| JP | 2017-035811 A | 2/2017 |
| JP | 2017-523934 A | 8/2017 |
| JP | 2017-528340 A | 9/2017 |
| JP | 2017-190505 A | 10/2017 |
| JP | 2018-012221 A | 1/2018 |
| JP | 2018-066056 A | 4/2018 |
| JP | 2018-187777 A | 11/2018 |
| JP | 2019-038157 A | 3/2019 |
| JP | 2019-064090 A | 4/2019 |
| JP | 2020-023189 A | 2/2020 |
| JP | 2020-524092 A | 8/2020 |
| WO | 2015/129733 A1 | 9/2015 |
| WO | 2015-135434 A1 | 9/2015 |
| WO | 2015-182675 A1 | 12/2015 |
| WO | 2016/020150 A1 | 2/2016 |
| WO | 2016-185626 A1 | 11/2016 |
| WO | 2017-008789 A1 | 1/2017 |

(56) References Cited

FOREIGN PATENT DOCUMENTS

| WO | 2017-038984 A1 | 3/2017 |
| WO | 2018/038751 A1 | 3/2018 |
| WO | 2018/210183 A1 | 11/2018 |

* cited by examiner

THREE-DIMENSIONAL SHAPING APPARATUS AND THREE-DIMENSIONAL SHAPED ARTICLE PRODUCTION METHOD The present application is based on, and claims priority from JP Application Serial Number 2020-214756, filed Dec. 24, 2020, the disclosure of which is hereby incorporated by reference herein in its entirety.

BACKGROUND

1. Technical Field

The present disclosure relates to a three-dimensional shaping apparatus and a three-dimensional shaped article production method.

2. Related Art

A three-dimensional shaping apparatus for producing a three-dimensional shaped article by ejecting, stacking, and hardening a plasticized material obtained by plasticization is known.

For example, JP-A-2006-192710 (Patent Document 1) describes a method for forming a three-dimensional article by extruding a material having thermoplasticity melted by heating with a preheater to a specific region on a base table from an extrusion nozzle that scans according to preset shape data, and further stacking a molten material on the material hardened on the base table.

Further, for example, WO 2016/185626 (Patent Document 2) discloses a head for three-dimensional shaping that plasticizes a material and ejects the plasticized material from multiple nozzles.

When a material is plasticized and shaping is performed by one stroke drawing as in Patent Document 1, the shaping time becomes long. On the other hand, in Patent Document 2, by providing multiple nozzles in a line, a shaped article is shaped at many sites by scanning once, and therefore, the shaping time can be shortened. Such multiple nozzles communicate with one another through a common flow channel, and ejection is controlled for each nozzle according to the shape of the shaped article.

However, when ejection from the first nozzle is started from a state in which ejection is stopped in the first nozzle among the multiple nozzles, the ejection responsiveness of the first nozzle is sometimes deteriorated.

SUMMARY

One aspect of a three-dimensional shaping apparatus according to the present disclosure includes
a plasticizing section that includes a screw and plasticizes a material by rotating the screw to form a plasticized material,
a stage having a deposition face at which the plasticized material is deposited,
an ejection section that ejects the plasticized material toward the deposition face, and has a first nozzle and a second nozzle, each of which communicates with the plasticizing section,
a first ejection adjusting section that adjusts an ejection amount of the plasticized material from the first nozzle,
a second ejection adjusting section that adjusts an ejection amount of the plasticized material from the second nozzle,
a moving section that relatively moves the ejection section with respect to the stage along a first axis parallel to the deposition face, and
a control unit that controls the plasticizing section, the first ejection adjusting section, and the second ejection adjusting section, in which
the control unit performs
a switching process for switching from a first state in which the ejection of the plasticized material from the first nozzle is stopped and the plasticized material is ejected from the second nozzle to a second state in which the plasticized material is ejected from the first nozzle and the second nozzle by controlling the first ejection adjusting section and the second ejection adjusting section, and
an ejection amount decreasing process for decreasing the ejection amount of the plasticized material from the second nozzle by controlling the screw or the second ejection adjusting section before switching from the first state to the second state.

One aspect of a three-dimensional shaped article production method according to the present disclosure is a three-dimensional shaped article production method for shaping a three-dimensional shaped article by plasticizing a material by rotating a screw so as to form a plasticized material in a plasticizing section, and ejecting the plasticized material toward a stage from a first nozzle and a second nozzle, each of which communicates with the plasticizing section, while relatively moving the first nozzle and the second nozzle with respect to the stage, and includes
switching from a first state in which the ejection of the plasticized material from the first nozzle is stopped and the plasticized material is ejected from the second nozzle to a second state in which the plasticized material is ejected from the first nozzle and the second nozzle by controlling a first ejection adjusting section that adjusts an ejection amount of the plasticized material from the first nozzle and a second ejection adjusting section that adjusts an ejection amount of the plasticized material from the second nozzle, and
decreasing the ejection amount of the plasticized material from the second nozzle by controlling the screw or the second ejection adjusting section before switching from the first state to the second state.

DESCRIPTION OF EXEMPLARY EMBODIMENTS

Hereinafter, preferred embodiments of the present disclosure will be described in detail using the drawings. Note that the embodiments described below are not intended to unduly limit the contents of the present disclosure described in the claims. Further, all the configurations described below are not necessarily essential configuration requirements of the present disclosure.

1. Three-Dimensional Shaping Apparatus 1.1. Overall Configuration

Figure 1:
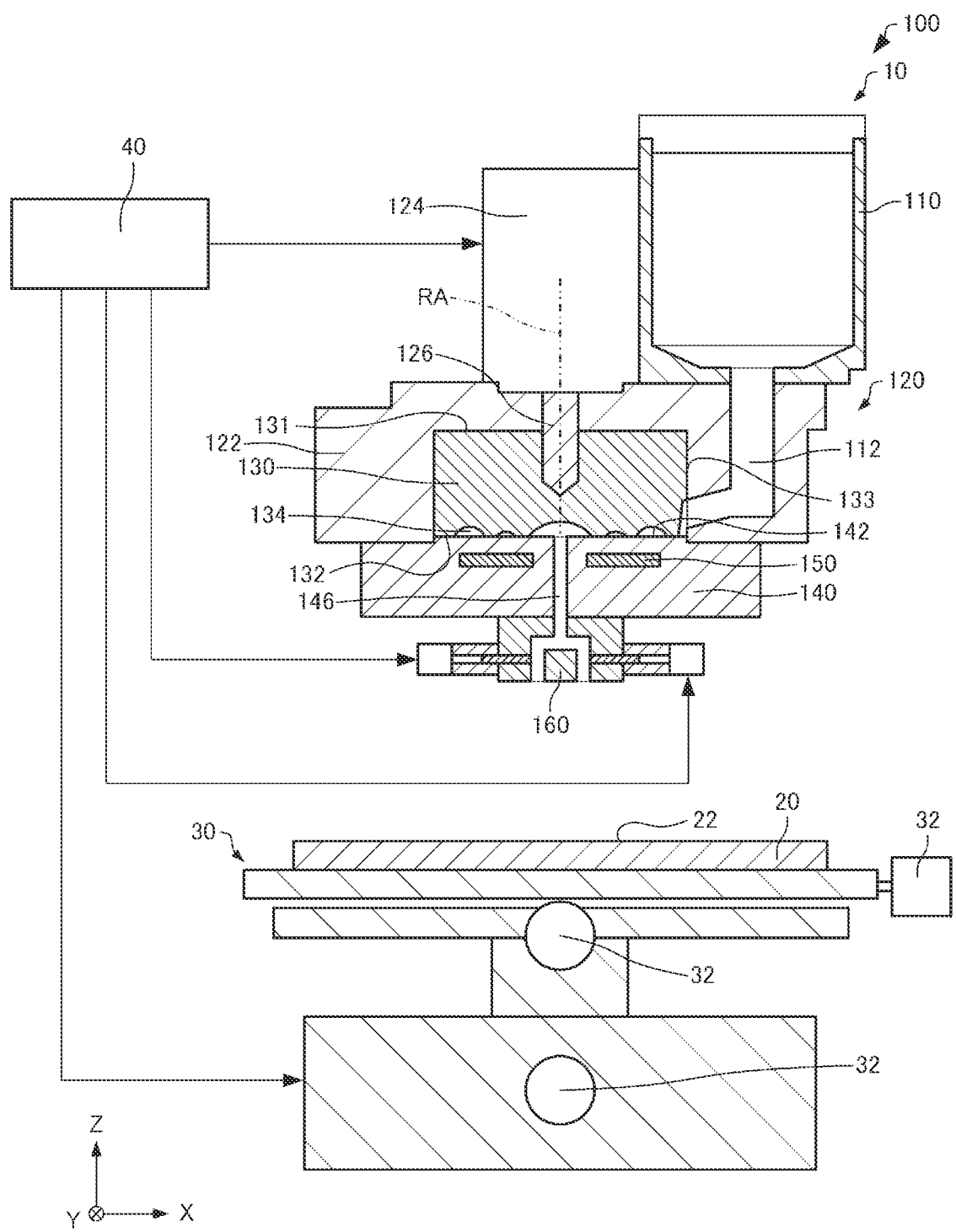
FIG. 1 is a cross-sectional view schematically showing a three-dimensional shaping apparatus according to the present embodiment.

First, a three-dimensional shaping apparatus according to the present embodiment will be described with reference to the drawings. FIG. 1 is a cross-sectional view schematically showing a three-dimensional shaping apparatus 100 according to the present embodiment. Note that in FIG. 1, as three axes orthogonal to one another, X axis, Y axis, and Z axis are shown. An X-axis direction and a Y-axis direction are each, for example, a horizontal direction. A Z-axis direction is, for example, a vertical direction.

The three-dimensional shaping apparatus 100 includes a shaping unit 10, a stage 20, a moving section 30, and a control unit 40 as shown in FIG. 1.

The three-dimensional shaping apparatus 100 changes the relative position of an ejection section 160 of the shaping unit 10 and the stage 20 by driving the moving section 30 while ejecting a plasticized material obtained by plasticization to the stage 20 from the ejection section 160. By doing this, the three-dimensional shaping apparatus 100 shapes a three-dimensional shaped article having a desired shape on the stage 20. The detailed configuration of the shaping unit 10 will be described below.

The stage 20 is moved by the moving section 30. At a deposition face 22 of the stage 20, the plasticized material ejected from the ejection section 160 is deposited, whereby a three-dimensional shaped article is formed. The plasticized material may be directly deposited at the deposition face 22 of the stage 20, but a sample plate is placed on the stage 20, and a three-dimensional shaped article may be formed on the sample plate. In this case, a shaping material is deposited at the stage 20 through the sample plate.

The moving section 30 relatively moves the ejection section 160 of the shaping unit 10 with respect to the stage 20 along the X axis parallel to the deposition face 22. In the illustrated example, the moving section 30 moves the stage 20 with respect to the shaping unit 10. The moving section 30 is constituted by, for example, a three-axis positioner for moving the stage 20 in the X-axis direction, Y-axis direction, and Z-axis direction by the driving forces of three motors 32. The motors 32 are controlled by the control unit 40.

The moving section 30 may be configured to move the shaping unit 10 without moving the stage 20. Alternatively, the moving section 30 may be configured to move both the shaping unit 10 and the stage 20.

The control unit 40 is constituted by, for example, a computer including a processor, a main storage device, and an input/output interface for performing signal input/output to/from the outside. The control unit 40, for example, exhibits various functions by execution of a program read in the main storage device by the processor. The control unit 40 controls the shaping unit 10 and the moving section 30. A specific process of the control unit 40 will be described below. The control unit 40 may be constituted by a combination of multiple circuits instead of a computer.

1.2. Shaping Unit

The shaping unit 10 includes, for example, a material feeding section 110, a plasticizing section 120, and the ejection section 160 as shown in FIG. 1.

To the material feeding section 110, a material in a pellet form or a powder form is fed. As the material to be fed to the material feeding section 110, for example, an acrylonitrile butadiene styrene (ABS) resin is exemplified.

The material feeding section 110 is constituted by, for example, a hopper. The material feeding section 110 and the plasticizing section 120 are coupled through a supply channel 112 provided below the material feeding section 110. The material fed to the material feeding section 110 is supplied to the plasticizing section 120 through the supply channel 112.

The plasticizing section 120 includes, for example, a screw case 122, a drive motor 124, a flat screw 130, a barrel 140, and a heating section 150. The plasticizing section 120 plasticizes a material in a solid state supplied from the material feeding section 110 by rotating the flat screw 130 so as to form a plasticized material in a paste form having fluidity, and supplies the plasticized material to the ejection section 160.

Note that the "plasticization" is a concept including melting, and refers to conversion to a state having fluidity from a solid. Specifically, in a case of a material in which glass transition occurs, the "plasticization" is to raise the temperature of the material to a temperature equal to or higher than the glass transition point, and in a case of a material in which glass transition does not occur, the "plasticization" is to raise the temperature of the material to a temperature equal to or higher than the melting point.

The screw case 122 is a housing that houses the flat screw 130. At a lower face of the screw case 122, the barrel 140 is provided. The flat screw 130 is housed in a space surrounded by the screw case 122 and the barrel 140.

The drive motor 124 is provided at an upper face of the screw case 122. The drive motor 124 is, for example, a servomotor. A shaft 126 of the drive motor 124 is coupled to an upper face 131 of the flat screw 130. The drive motor 124 is controlled by the control unit 40. The shaft 126 of the drive motor 124 may be coupled to the upper face 131 of the flat screw 130 through a decelerator.

Figure 2:
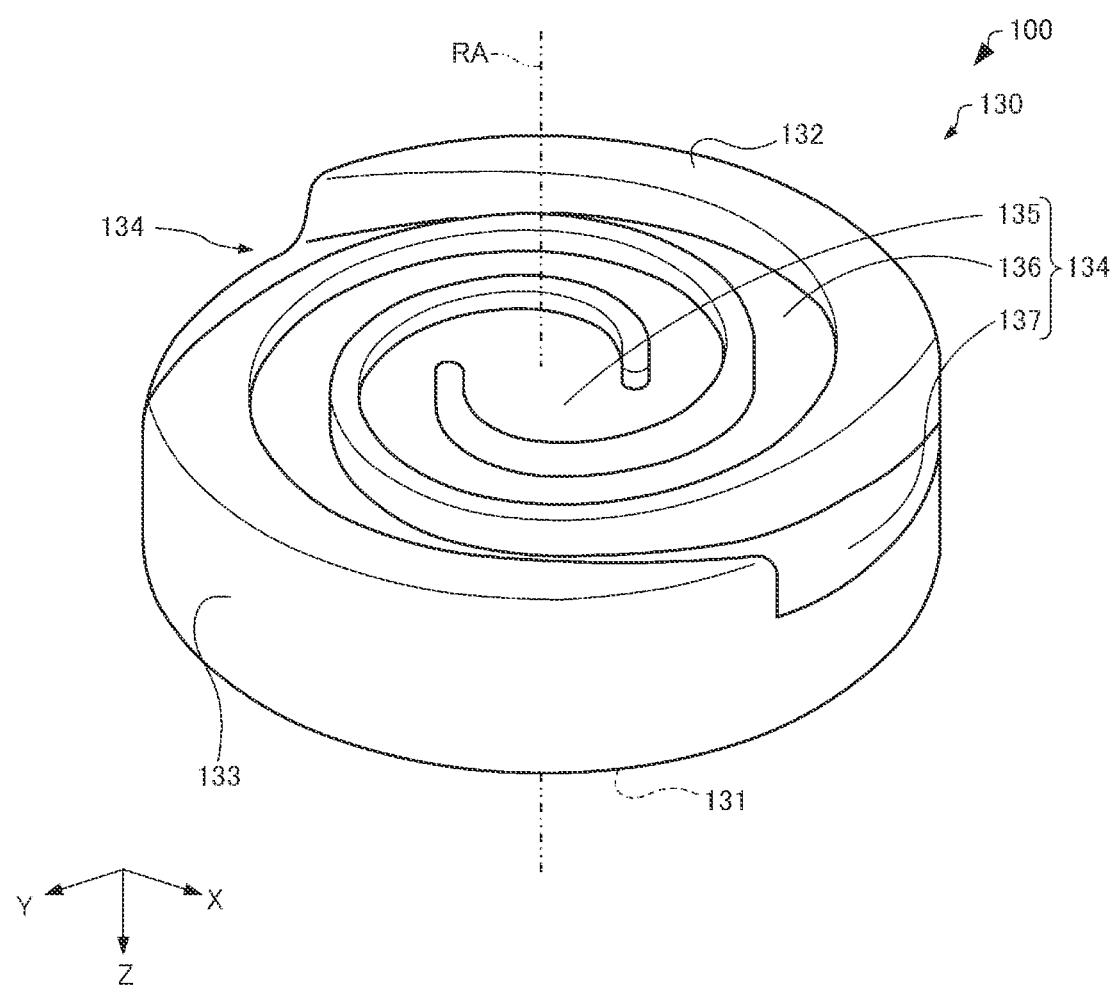
FIG. 2 is a perspective view schematically showing a flat screw of the three-dimensional shaping apparatus according to the present embodiment.

The flat screw 130 has a substantially columnar shape in which a size in a direction of a rotational axis RA is smaller than a size in a direction orthogonal to the direction of the rotational axis RA. In the illustrated example, the rotational axis RA is parallel to the Z axis. The flat screw 130 is rotated around the rotational axis RA by a torque generated by the drive motor 124. The flat screw 130 has an upper face 131, a grooved face 132 at an opposite side to the upper face 131, and a side face 133 that couples the upper face 131 to the grooved face 132. The grooved face 132 is provided with a first groove 134. Here, FIG. 2 is a perspective view schematically showing the flat screw 130. Note that FIG. 2 shows a state in which the up-and-down positional relationship is reversed to that of the state shown in FIG. 1 for the sake of convenience. Further, in FIG. 1, the flat screw 130 is shown in a simplified manner.

As shown in FIG. 2, at the grooved face 132 of the flat screw 130, the first groove 134 is provided. The first groove 134 includes, for example, a central portion 135, a coupling portion 136, and a material introduction portion 137. The central portion 135 is opposed to a communication hole 146 provided in the barrel 140. The central portion 135 communicates with the communication hole 146. The coupling portion 136 couples the central portion 135 to the material introduction portion 137. In the illustrated example, the coupling portion 136 is provided in a spiral shape from the central portion 135 toward the outer circumference of the grooved face 132. The material introduction portion 137 is provided at the outer circumference of the grooved face 132. That is, the material introduction portion 137 is provided at the side face 133 of the flat screw 130. A material fed from the material feeding section 110 is introduced into the first groove 134 from the material introduction portion 137, and passes through the coupling portion 136 and the central portion 135, and is conveyed to the communication hole 146 provided in the barrel 140. The number of first grooves 134 is not particularly limited, and may be 3 or more, or may be only one.

Figure 3:
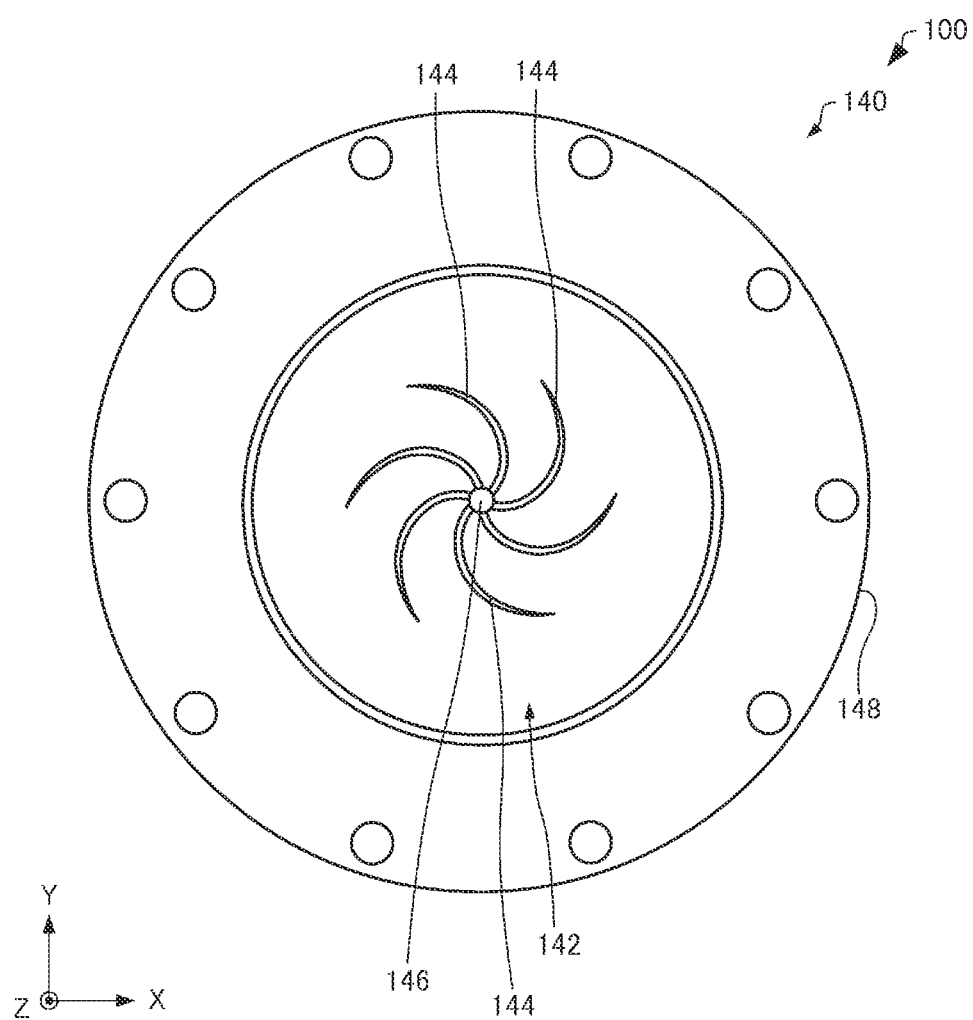
FIG. 3 is a plan view schematically showing a barrel of the three-dimensional shaping apparatus according to the present embodiment.

The barrel 140 is provided below the flat screw 130 as shown in FIG. 1. The barrel 140 has an opposed face 142 opposed to the grooved face 132 of the flat screw 130. At the center of the opposed face 142, the communication hole 146 that communicates with the first groove 134 is provided. Here, FIG. 3 is a plan view schematically showing the barrel 140. Note that in FIG. 1, the barrel 140 is shown in a simplified manner for the sake of convenience.

As shown in FIG. 3, at the opposed face 142 of the barrel 140, a second groove 144 and the communication hole 146 are provided. Multiple second grooves 144 are provided. In the illustrated example, six second grooves 144 are provided, but the number thereof is not particularly limited. The multiple second grooves 144 are provided around the communication hole 146 when viewed from the Z-axis direction. One end of the second groove 144 is coupled to the communication hole 146, and the second groove 144 extends in a spiral shape from the communication hole 146 toward an outer circumference 148 of the barrel 140. The second groove 144 has a function of guiding the plasticized material to the communication hole 146.

The shape of the second groove 144 is not particularly limited, and may be, for example, a linear shape. Further, one end of the second groove 144 need not be coupled to the communication hole 146. In addition, the second groove 144 need not be provided at the opposed face 142. However, in consideration that the plasticized material is efficiently guided to the communication hole 146, the second groove 144 is preferably provided at the opposed face 142.

The heating section 150 is provided in the barrel 140 as shown in FIG. 1. The heating section 150 heats the material supplied between the flat screw 130 and the barrel 140. The heating section 150 is, for example, a heater. The shape of the heating section 150 may be a ring shape when viewed from the Z-axis direction. The heating section 150 is controlled by the control unit 40.

1.3. Ejection Section

The ejection section 160 is provided below the barrel 140 as shown in FIG. 1. The ejection section 160 ejects the supplied plasticized material toward the deposition face 22 of the stage 20.

Figure 4:
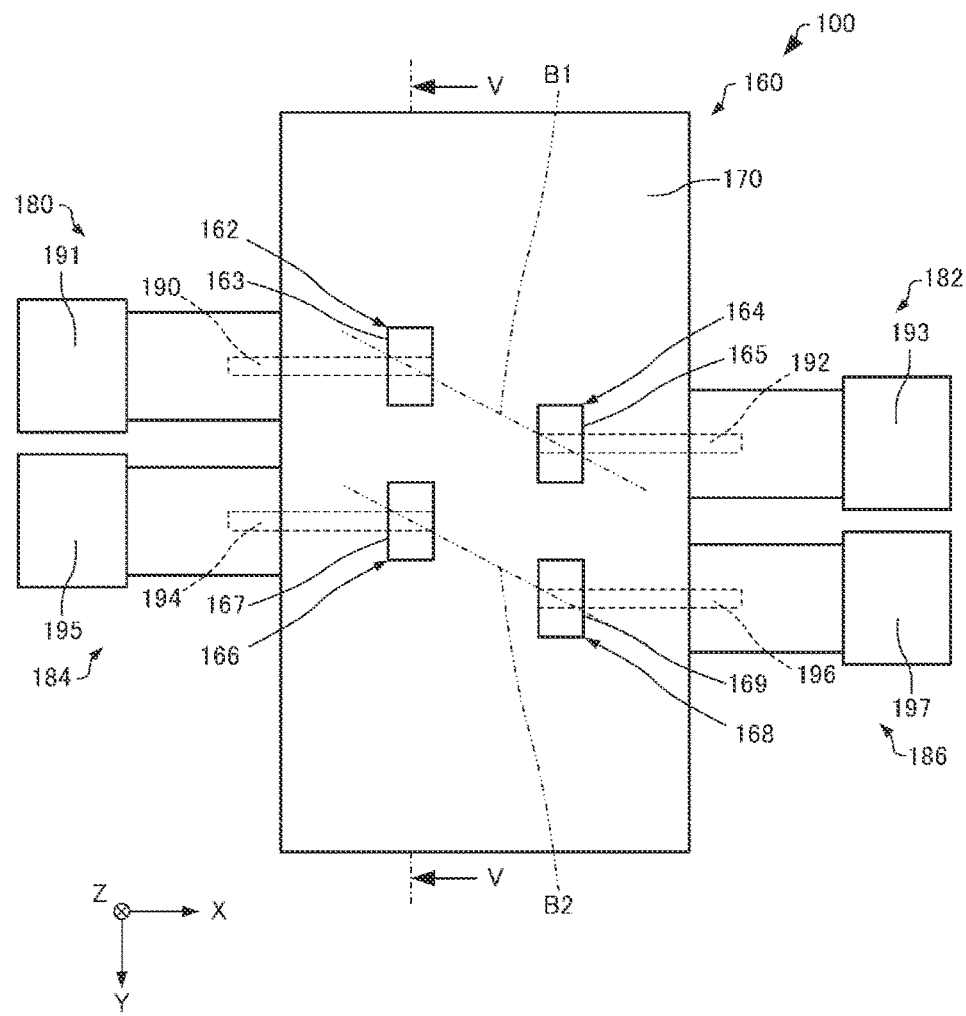
FIG. 4 is a bottom view schematically showing an ejection section of the three-dimensional shaping apparatus according to the present embodiment.
Figure 5:
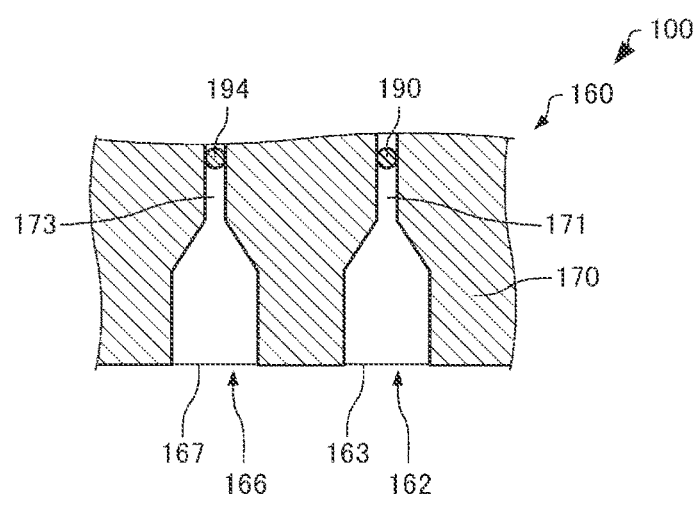
FIG. 5 is a cross-sectional view schematically showing the ejection section of the three-dimensional shaping apparatus according to the present embodiment.
Figure 6:
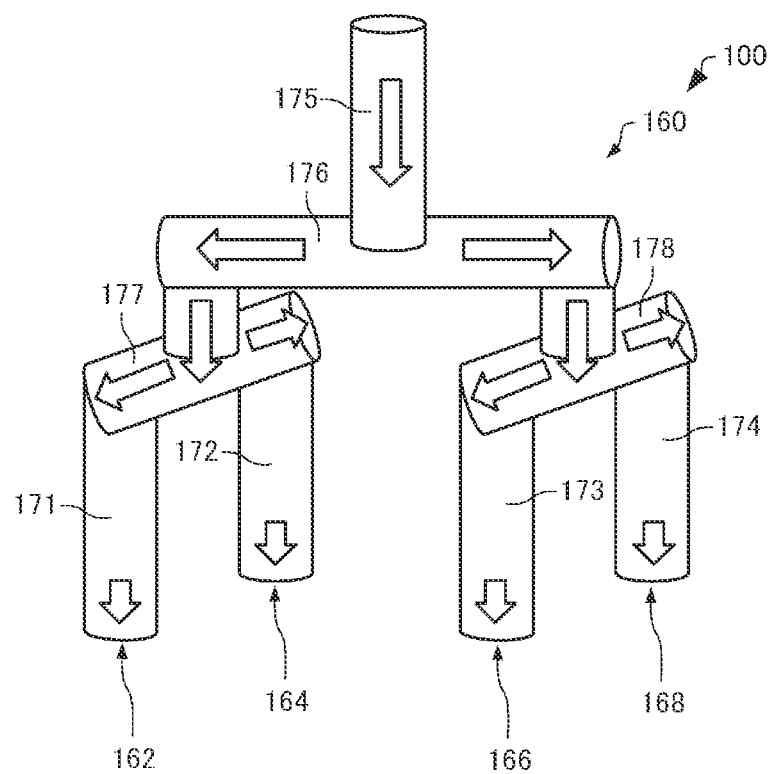
FIG. 6 is a perspective view schematically showing flow channels of the ejection section of the three-dimensional shaping apparatus according to the present embodiment.

Here, FIG. 4 is a bottom view schematically showing the ejection section 160. FIG. 5 is a cross-sectional view taken along the line V-V of FIG. 4 schematically showing the ejection section 160. FIG. 6 is a perspective view schematically showing flow channels of the ejection section 160. In FIGS. 1 and 6, the ejection section 160 is shown in a simplified manner for the sake of convenience. Further, in FIG. 6, the flow of the plasticized material is indicated by arrows.

As shown in FIGS. 4 to 6, the ejection section 160 has, for example, a first nozzle 162, a second nozzle 164, a third nozzle 166, and a fourth nozzle 168. The nozzles 162, 164, 166, and 168 eject the plasticized material toward the deposition face 22 of the stage 20.

The ejection section 160 has a flow channel substrate 170. The nozzles 162, 164, 166, and 168 are provided in the flow channel substrate 170. As shown in FIG. 6, the first nozzle 162 has a first flow channel 171. The second nozzle 164 has a second flow channel 172. The third nozzle 166 has a third flow channel 173. The fourth nozzle 168 has a fourth flow channel 174. The flow channels 171, 172, 173, and 174 each have a portion whose width gradually increases toward the −Z-axis direction as shown in FIG. 5.

As shown in FIG. 6, the ejection section 160 has a common flow channel 175, a first branch flow channel 176, a second branch flow channel 177, and a third branch flow channel 178. The flow channels 171 and 172 communicate with the second branch flow channel 177. The flow channels 173 and 174 communicate with the third branch flow channel 178. The nozzles 162, 164, 166, and 168 communicate with the plasticizing section 120. Specifically, the flow channels 171, 172, 173, and 174 of the nozzles 162, 164, 166, and 168 communicate with the communication hole 146 provided in the barrel 140 of the plasticizing section 120 through the flow channels 175, 176, 177, and 178. The flow channels 171 to 178 are provided in the flow channel substrate 170.

The plasticized material formed by the plasticizing section 120 reaches the common flow channel 175 through the communication hole 146, and is branched by the first branch flow channel 176. The plasticized material branched by the first branch flow channel 176 is further branched by the second branch flow channel 177, passes through the first flow channel 171 and the second flow channel 172, and is ejected from the first nozzle 162 and the second nozzle 164. Further, the plasticized material branched by the first branch flow channel 176 is branched by the third branch flow channel 178, passes through the third flow channel 173 and the fourth flow channel 174, and is ejected from the third nozzle 166 and the fourth nozzle 168.

As shown in FIG. 4, the first nozzle 162 has a first nozzle opening 163. The second nozzle 164 has a second nozzle opening 165. The third nozzle 166 has a third nozzle opening 167. The fourth nozzle 168 has a fourth nozzle opening 169. The nozzles 162, 164, 166, and 168 eject the plasticized material from the nozzle openings 163, 165, 167, and 169, respectively. The nozzle openings 163, 165, 167, and 169 each have, for example, a rectangular shape when viewed in the Z-axis direction.

In the example shown in FIG. 4, the first nozzle 162 and the second nozzle 164 are juxtaposed in a direction of a first virtual axis B1 crossing the X axis. The third nozzle 166 and the fourth nozzle 168 are juxtaposed in a direction of a second virtual axis B2 crossing the X axis. The first nozzle 162 and the third nozzle 166 are juxtaposed in the Y-axis direction. The second nozzle 164 and the fourth nozzle 168 are juxtaposed in the Y-axis direction. In the illustrated example, the nozzles 162, 164, 166, and 168 are provided in a staggered manner. The number of nozzles provided in the flow channel substrate 170 is not particularly limited as long as multiple nozzles are provided.

1.4. Ejection Adjusting Section

The shaping unit 10 has, for example, a first ejection adjusting section 180, a second ejection adjusting section 182, a third ejection adjusting section 184, and a fourth ejection adjusting section 186.

The first ejection adjusting section 180 adjusts the ejection amount of the plasticized material from the first nozzle 162. The second ejection adjusting section 182 adjusts the ejection amount of the plasticized material from the second nozzle 164. The third ejection adjusting section 184 adjusts the ejection amount of the plasticized material from the third nozzle 166. The fourth ejection adjusting section 186 adjusts the ejection amount of the plasticized material from the fourth nozzle 168.

Figure 7:
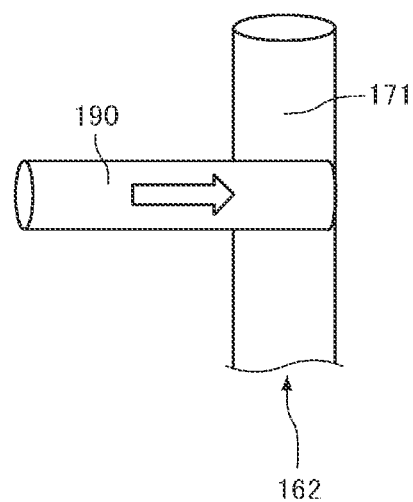
FIG. 7 is a view for illustrating the movement of a first rod pin of the three-dimensional shaping apparatus according to the present embodiment.
Figure 8:
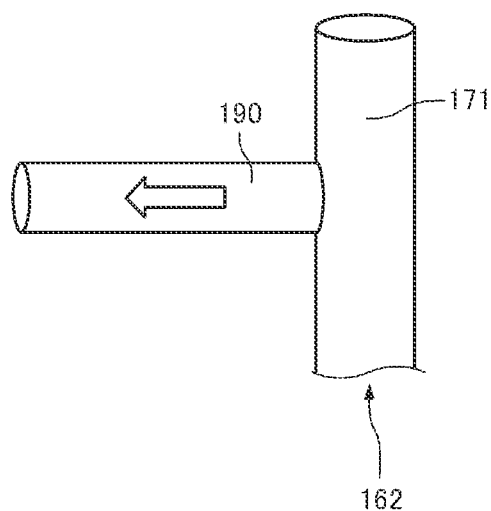
FIG. 8 is a view for illustrating the movement of the first rod pin of the three-dimensional shaping apparatus according to the present embodiment.

The first ejection adjusting section 180 has a first rod pin 190 and a first driving mechanism 191. The second ejection adjusting section 182 has a second rod pin 192 and a second driving mechanism 193. The third ejection adjusting section 184 has a third rod pin 194 and a third driving mechanism 195. The fourth ejection adjusting section 186 has a fourth rod pin 196 and a fourth driving mechanism 197. Here, FIGS. 7 and 8 are views for illustrating the movement of the first rod pin 190.

The rod pins 190, 192, 194, and 196 move in a direction crossing a flowing direction of the plasticized material. In the illustrated example, the flowing direction of the plasticized material is the Z-axis direction, and the rod pins 190, 192, 194, and 196 move in the X-axis direction.

The driving mechanisms 191, 193, 195, and 197 move the rod pins 190, 192, 194, and 196, respectively, in the X-axis direction. For example, as shown in FIG. 7, the first driving mechanism 191 moves the first rod pin 190 in the direction of the arrow, for example, in the +X-axis direction. By doing this, the first flow channel 171 of the first nozzle 162 is blocked, and is brought into a state in which the plasticized material is not ejected from the first nozzle 162. From the state shown in FIG. 7, the first driving mechanism 191 moves the first rod pin 190 in the direction of the arrow, for example, in the −X-axis direction as shown in FIG. 8. By doing this, the first flow channel 171 is opened and is brought into a state in which the plasticized material is ejected from the first nozzle 162. The driving mechanisms 191, 193, 195, and 197 can adjust the flow rate of the plasticized material in the flow channels 171, 172, 173, and 174 by moving the rod pins 190, 192, 194, and 196, respectively, in the X-axis direction.

The driving mechanisms 191, 193, 195, and 197 are, for example, pneumatic driving mechanisms for moving the rod pins 190, 192, 194, and 196 using compressed air supplied from a compressor. The driving mechanisms 191, 193, 195, and 197 may be solenoid-type driving mechanisms using an electromagnetic force generated by a solenoid, or may be electrical driving mechanisms using a rotational force generated by a motor. However, in consideration of miniaturization, the driving mechanisms 191, 193, 195, and 197 are preferably pneumatic driving mechanisms.

1.5. Control Unit

Figure 9:
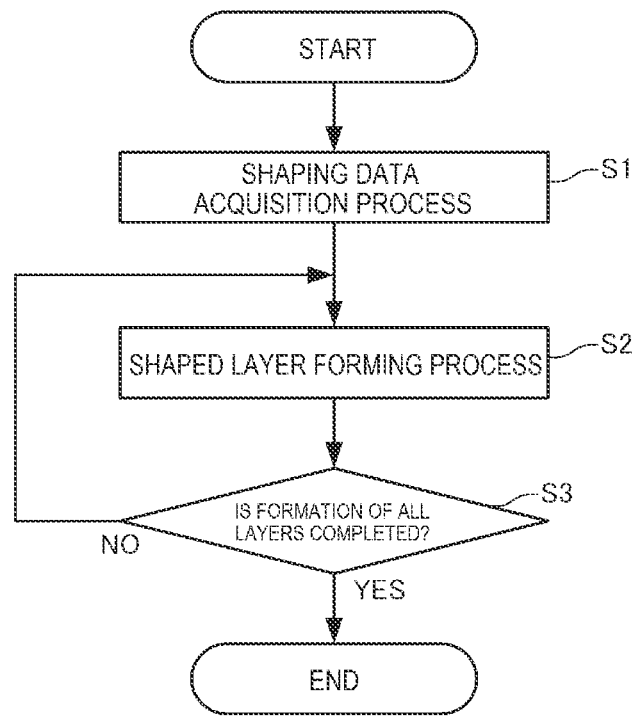
FIG. 9 is a flowchart for illustrating a process of a control unit of the three-dimensional shaping apparatus according to the present embodiment.

The control unit 40 controls the plasticizing section 120 and the ejection adjusting sections 180, 182, 184, and 186. Specifically, the control unit 40 controls the drive motor 124 that drives the flat screw 130, and the driving mechanisms 191, 193, 195, and 197. FIG. 9 is a flowchart for illustrating the process of the control unit 40.

A user, for example, operates an unillustrated operation section and outputs a process start signal for starting the process to the control unit 40. The operation section is realized by, for example, a mouse, a keyboard, a touch panel, or the like. The control unit 40 starts the process when receiving the process start signal.

First, as shown in FIG. 9, the control unit 40 performs a shaping data acquisition process for acquiring shaping data for shaping a three-dimensional shaped article as Step S1. The shaping data include information regarding the movement path of the ejection section 160 with respect to the stage 20, the amount of the plasticized material to be ejected from the nozzles 162, 164, 166, and 168 of the ejection section 160, and the like. The shaping data are generated by, for example, allowing slicer software installed on a computer coupled to the three-dimensional shaping apparatus 100 to read shape data. The shape data are data representing a target shape of a three-dimensional shaped article generated using three-dimensional CAD (Computer Aided Design) software, three-dimensional CG (Computer Graphics) software, or the like. As the shape data, for example, data in the STL (Standard Triangulated Language) format, the AMF (Additive Manufacturing File Format), or the like are used. The slicer software divides a target shape of a three-dimensional shaped article into layers having a predetermined thickness and generates shaping data for each layer. The shaping data are represented by G code, M code, or the like. The control unit 40 acquires shaping data from a computer coupled to the three-dimensional shaping apparatus 100 or a recording medium such as a USB (Universal Serial Bus) memory.

Figure 10:
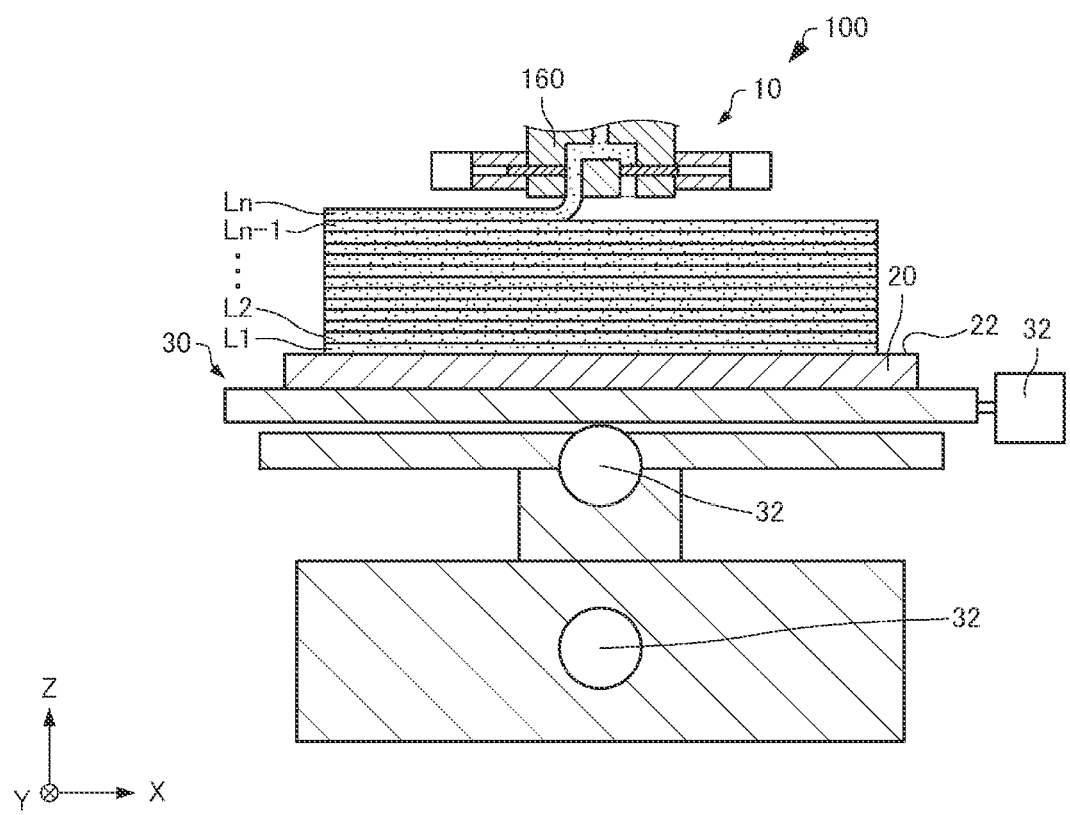
FIG. 10 is a cross-sectional view for illustrating a shaped layer forming process of the three-dimensional shaping apparatus according to the present embodiment.

Subsequently, the control unit 40 performs a shaped layer forming process for forming a shaped layer by controlling the moving section 30, the plasticizing section 120, and the ejection adjusting sections 180, 182, 184, and 186 based on the shaping data as Step S2. The control unit 40 forms the plasticized material by controlling the rotation speed of the flat screw 130 and the heating section 150. The plasticized material is kept formed while performing the shaped layer forming process. Here, FIG. 10 is a cross-sectional view for illustrating the shaped layer forming process. In FIG. 10, the shaping unit 10 is shown in a simplified manner for the sake of convenience.

Before starting the shaped layer forming process, that is, before starting formation of a first layer L1 that is a shaped layer at the first layer, the ejection section 160 is placed at a position closer to an initial position in the −X-axis direction than to an end portion in the −X-axis direction of the stage 20. When the shaped layer forming process is started, as shown in FIG. 10, the control unit 40 relatively moves the ejection section 160 in the +X-axis direction with respect to the stage 20 by controlling the moving section 30. When the ejection section 160 passes on the stage 20, the plasticized material is ejected in a continuous linear form from the nozzles 162, 164, 166, and 168 of the ejection section 160. At this time, the control unit 40 individually switches stop and restart of ejection of the plasticized material from the nozzles 162, 164, 166, and 168 by, for example, controlling the ejection adjusting sections 180, 182, 184, and 186 based on the shaping data. By doing this, the first layer L1 is formed. In FIG. 10, layers up to an n-th layer Ln at the n-th layer wherein n represents an arbitrary natural number are shown. The switching of the nozzles 162, 164, 166, and 168 will be described later.

Subsequently, as shown in FIG. 9, the control unit 40 performs a determination process for determining whether or not the formation of all shaped layers is completed based on the shaping data as Step S3. When it is determined that the formation of all shaped layers is not completed (in a case of "NO" in Step S3), the control unit 40 repeats Step S2 and Step S3 until it is determined that the formation of all shaped layers is completed. When it is determined that the formation of all shaped layers is completed (in a case of "YES" in Step S3), the control unit 40 ends the process.

Figure 11:
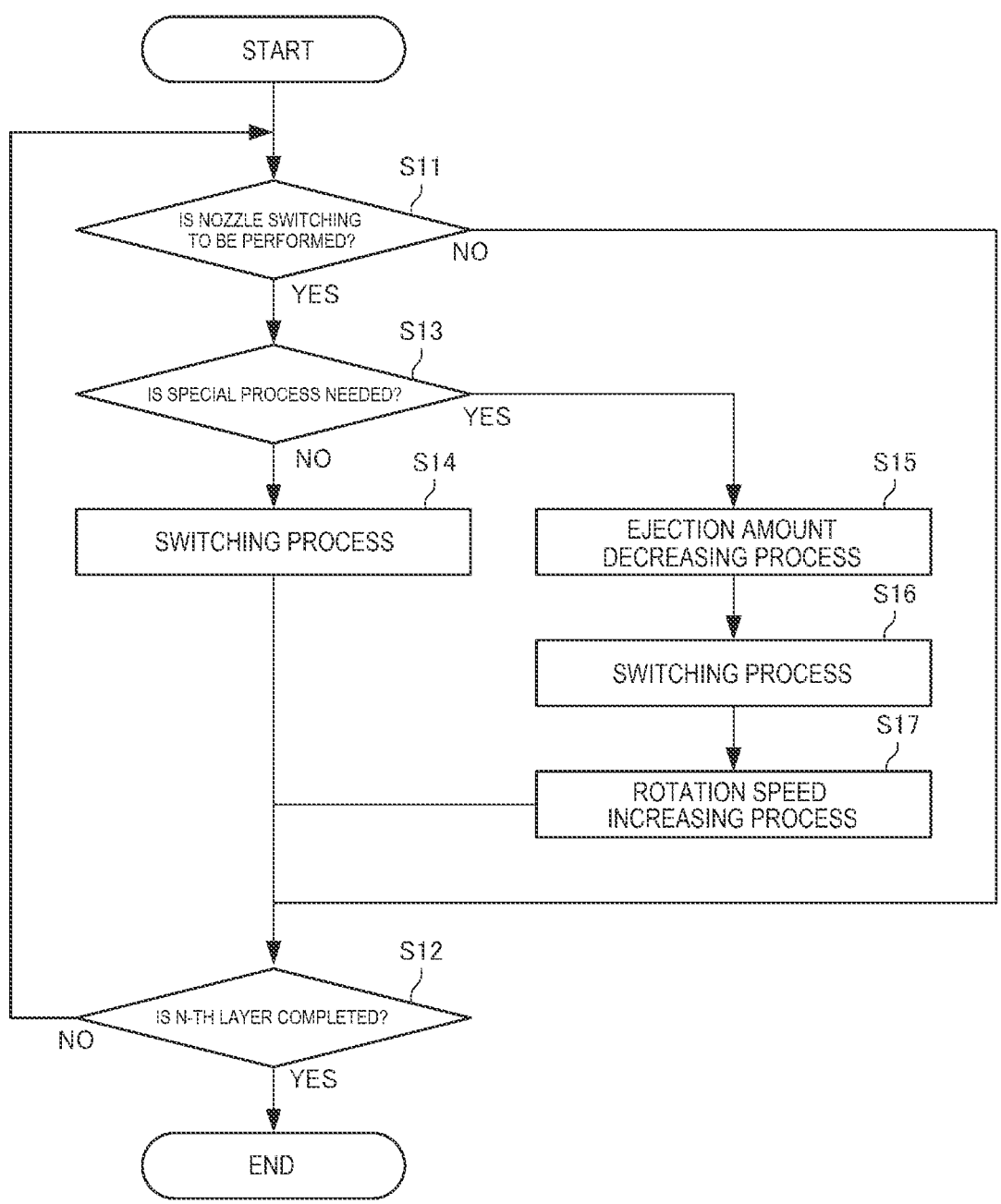
FIG. 11 is a flowchart for illustrating the shaped layer forming process of the control unit of the three-dimensional shaping apparatus according to the present embodiment.

Here, FIG. 11 is a flowchart for illustrating the shaped layer forming process of Step S2.

The control unit 40 starts the shaped layer forming process after a predetermined time has elapsed from the start of a plasticized material forming process based on the shaping data. In the shaped layer forming process shown below, the plasticized material is in a state of reaching the flow channels 171, 172, 173, and 174 of the nozzles 162, 164, 166, and 168, and by controlling the ejection adjusting sections 180, 182, 184, and 186, stop and restart of ejection of the plasticized material from the nozzles 162, 164, 166, and 168 can be switched.

In the shaped layer forming process described below, the process performed with respect to the first nozzle 162 and the second nozzle 164 will be described, and the process performed with respect to the third nozzle 166 and the fourth nozzle 168 will not be described for the sake of convenience.

First, as shown in FIG. 11, the control unit 40 performs a determination process for determining whether or not nozzle switching is to be performed based on the shaping data as Step S11. The "nozzle switching" is to perform stop or restart of ejection of the plasticized material for at least one of the nozzles 162 and 164.

When it is determined that nozzle switching is not to be performed (in a case of "NO" in Step S11), the control unit 40 performs a determination process for determining whether or not the shaping of the n-th layer is completed. When it is determined that the shaping of the n-th layer is completed (in a case of "YES" in Step S12), the control unit 40 ends the shaped layer forming process and transfers the process to Step S3. When it is not determined that the shaping of the n-th layer is completed (in a case of "NO" in Step S12), the control unit 40 returns the process to Step S11.

When it is determined that nozzle switching is to be performed (in a case of "YES" in Step S11), the control unit 40 performs a determination process for determining whether or not a special process is needed based on the shaping data as Step S13. The determination process of Step S13 will be specifically described.

The ejection section 160 having the first nozzle 162 and the second nozzle 164 has any state of the following first to fourth states.

First state: first nozzle OFF, second nozzle ON
Second state: first nozzle ON, second nozzle ON
Third state: first nozzle ON, second nozzle OFF
Fourth state: first nozzle OFF, second nozzle OFF Note that the "nozzle OFF" is a state in which the plasticized material is not ejected from the nozzle, and the "nozzle ON" is a state in which the plasticized material is ejected from the nozzle.

The control unit 40 determines that a special process is needed when the state is switched from the first state to the second state, or when the state is switched from the third state to the second state. The control unit 40 determines that a special process is not needed in a case other than these two cases, for example, when the state is switched from the second state to the third state.

When it is determined that a special process is not needed (in a case of "NO" in Step S13), the control unit 40 switches the state of the ejection section 160 by controlling the ejection adjusting sections 180 and 182. For example, when the state is switched from the second state to the third state, the control unit 40 blocks the second flow channel 172 with the second rod pin 192 by driving the second driving mechanism 193. By doing this, it is possible to switch from the second state in which the plasticized material is ejected from the first nozzle 162 and the second nozzle 164 to the third state in which the plasticized material is ejected only from the first nozzle 162.

When it is determined that a special process is needed (in a case of "YES" in Step S13), the control unit 40 performs a process of Step S15. Hereinafter, a case where the state is switched from the first state to the second state will be described. As described above, the first state is a state in which the ejection of the plasticized material from the first nozzle 162 is stopped and the plasticized material is ejected from the second nozzle 164. The second state is a state in which the plasticized material is ejected from the first nozzle 162 and the second nozzle 164.

In Step S15, the control unit 40 performs an ejection amount decreasing process for decreasing the ejection amount of the plasticized material from the second nozzle 164 by controlling the flat screw 130 based on the shaping data. Specifically, the control unit 40 rotates the flat screw 130 by controlling the drive motor 124 so as to decrease the rotation speed of the flat screw 130 to a first rotation speed from the rotation speed of the flat screw 130 before performing the ejection amount decreasing process. The rotation speed of the flat screw 130 before performing the ejection amount decreasing process is, for example, the rotation speed of the flat screw 130 in Step S14. By doing this, the ejection amount of the plasticized material from the second nozzle 164 is decreased. The control unit 40 may stop the rotation of the flat screw 130 by controlling the drive motor 124. In this case, the ejection of the plasticized material from the second nozzle 164 is stopped.

Subsequently, the control unit 40 performs a switching process for switching from the first state to the second state by controlling the ejection adjusting sections 180 and 182 as Step S16. Specifically, the control unit 40 opens the first flow channel 171 by controlling the first driving mechanism 191. By doing this, it is possible to switch from the first state in which the plasticized material is ejected only from the second nozzle 164 to the second state in which the plasticized material is ejected from the first nozzle 162 and the second nozzle 164.

The switching process of Step S16 is such that the control unit 40 outputs a signal for opening the first flow channel 171 to the first ejection adjusting section 180. The switching process is started by outputting the signal. The first ejection adjusting section 180 opens the first flow channel 171 by moving the first rod pin 190 after receiving the signal from the control unit 40. There is, for example, a difference in time between transmission of the signal from the control unit 40 and opening of the first flow channel 171. Further, the ejection amount decreasing process is such that the control unit 40 outputs a signal for decreasing the rotation of the flat screw 130 to the drive motor 124. The ejection amount decreasing process is started by outputting the signal.

Subsequently, the control unit 40 performs a rotation speed increasing process for rotating the flat screw 130 by increasing the rotation speed of the flat screw 130 to a second rotation speed from the first rotation speed after switching from the first state to the second state as Step S17. Specifically, the control unit 40 returns the rotation speed of the flat screw 130 to the rotation speed in the first state by controlling the drive motor 124. When the rotation of the flat screw 130 is stopped in Step S15, the control unit 40 restarts the rotation of the flat screw 130. Thereafter, the control unit 40 performs the determination process of Step S12.

In the above description, the shaped layer forming process with respect to the first nozzle 162 and the second nozzle 164 is described, however, the description can be applied to the ejection section having three or more nozzles. A special process is performed when an "arbitrary nozzle" among multiple nozzles is changed to on from off, and also when at least one nozzle among the nozzles other than the "arbitrary nozzle" remains on as described above. For example, a special process is performed when the state is switched from a state in which the nozzles 162 and 164 are on and the nozzles 166 and 168 are off to a state in which the nozzles 162, 164, and 166 are on and the nozzle 168 is off, or when the state is switched from a state in which the nozzles 162 and 164 are on and the nozzles 166 and 168 are off to a state in which the nozzles 162 and 166 are on and the nozzles 164 and 168 are off, or the like.

1.6. Operational Effects

In the three-dimensional shaping apparatus 100, the control unit 40 performs a switching process for switching from a first state in which the ejection of the plasticized material from the first nozzle 162 is stopped and the plasticized material is ejected from the second nozzle 164 to a second state in which the plasticized material is ejected from the first nozzle 162 and the second nozzle 164 by controlling the first ejection adjusting section 180 and the second ejection adjusting section 182. Further, the control unit 40 performs an ejection amount decreasing process for decreasing the ejection amount of the plasticized material from the second nozzle 164 by controlling the flat screw 130 before switching from the first state to the second state.

Therefore, in the three-dimensional shaping apparatus 100, the ejection responsiveness of the first nozzle 162 can be improved. When the state is switched from the first state to the second state, in the first state, the flow of the plasticized material toward the second nozzle occurs, and therefore, it takes time for the plasticized material to flow into the first nozzle by merely switching to the second state without doing any other operation, and the responsiveness of the first nozzle is deteriorated. In the three-dimensional shaping apparatus 100, by performing the ejection amount decreasing process before switching from the first state to the second state so as to weaken the flow of the plasticized material to the second nozzle 164, the plasticized material can be made easy to flow into the first nozzle 162, and therefore, the ejection responsiveness of the first nozzle 162 can be improved. As a result, the time for shaping a three-dimensional shaped article can be shortened.

In the three-dimensional shaping apparatus 100, the control unit 40 rotates the flat screw 130 by decreasing the rotation speed of the flat screw 130 to a first rotation speed from the rotation speed before performing the ejection amount decreasing process in the ejection amount decreasing process, and the control unit 40 performs a rotation speed increasing process for rotating the flat screw 130 by increasing the rotation speed to a second rotation speed from the first rotation speed after switching from the first state to the second state. Therefore, in the three-dimensional shaping apparatus 100, after switching from the first state to the second state, the ejection amount of the plasticized material from the second nozzle 164 can be returned to the ejection amount in the first state.

In the three-dimensional shaping apparatus 100, the control unit 40 starts the ejection amount decreasing process before starting the switching process. Therefore, in the three-dimensional shaping apparatus 100, as compared to a case where the ejection amount decreasing process is started after starting the switching process, the ejection amount decreasing process can be more reliably performed before switching from the first state to the second state.

In the three-dimensional shaping apparatus 100, the control unit 40 stops the rotation of the flat screw 130 in the ejection amount decreasing process, and restarts the rotation of the flat screw 130 in the rotation speed increasing process. Therefore, in the three-dimensional shaping apparatus 100, the flow of the plasticized material to the second nozzle 164 can be stopped before switching from the first state to the second state, and therefore, the ejection responsiveness of the first nozzle 162 can be further improved.

In the three-dimensional shaping apparatus 100, the first nozzle 162 and the second nozzle 164 are juxtaposed in a direction crossing the X axis as the first axis. The moving section 30 relatively moves the ejection section 160 with respect to the stage 20 along the X axis. In the three-dimensional shaping apparatus 100, the first nozzle 162 and the second nozzle 164 are juxtaposed in a direction crossing the direction of the relative movement of the stage 20 with respect to the ejection section 160, and therefore, for example, multiple line widths can be shaped by one movement of the stage 20. Accordingly, the shaping efficiency can be improved.

In the three-dimensional shaping apparatus 100, the first ejection adjusting section 180 has the first rod pin 190 that moves in a direction crossing the flowing direction of the plasticized material, and the second ejection adjusting section 182 has the second rod pin 192 that moves in a direction crossing the flowing direction of the plasticized material. Therefore, in the three-dimensional shaping apparatus 100, for example, as compared to a case where a flow channel of a nozzle is opened and closed with a butterfly valve, the distance between the ejection adjusting sections 180 and 182 can be decreased. Accordingly, miniaturization can be achieved.

In the three-dimensional shaping apparatus 100, the plasticizing section 120 includes the flat screw 130 having the grooved face 132 with the first groove 134 formed therein, the barrel 140 that has the opposed face 142 opposed to the grooved face 132 and that is provided with the communication hole 146 communicating with the first nozzle 162 and the second nozzle 164, and the heating section 150 that heats a material between the flat screw 130 and the barrel 140. Therefore, in the three-dimensional shaping apparatus 100, as compared to a case where an in-line screw is used in place of the flat screw 130, miniaturization can be achieved. When the apparatus is not intended to be miniaturized, the apparatus may be configured to include an in-line screw having a spiral groove formed in a long shaft instead of the flat screw 130, and a cylindrical barrel surrounding the in-line screw, and to plasticize a material using relative rotation of the in-line screw and the cylindrical barrel.

In the three-dimensional shaping apparatus 100, the first nozzle opening 163 of the first nozzle 162 and the second nozzle opening 165 of the second nozzle 164 each have a rectangular shape when viewed from the flowing direction of the plasticized material. Therefore, in the three-dimensional shaping apparatus 100, for example, as compared to a case where the first nozzle opening and the second nozzle opening each have a circular shape, a possibility of generating an unintended gap between the plasticized material ejected from the first nozzle 162 and the plasticized material ejected from the second nozzle 164 can be decreased.

2. Modifications of Three-Dimensional Shaping Apparatus 2.1. First Modification

Figure 12:
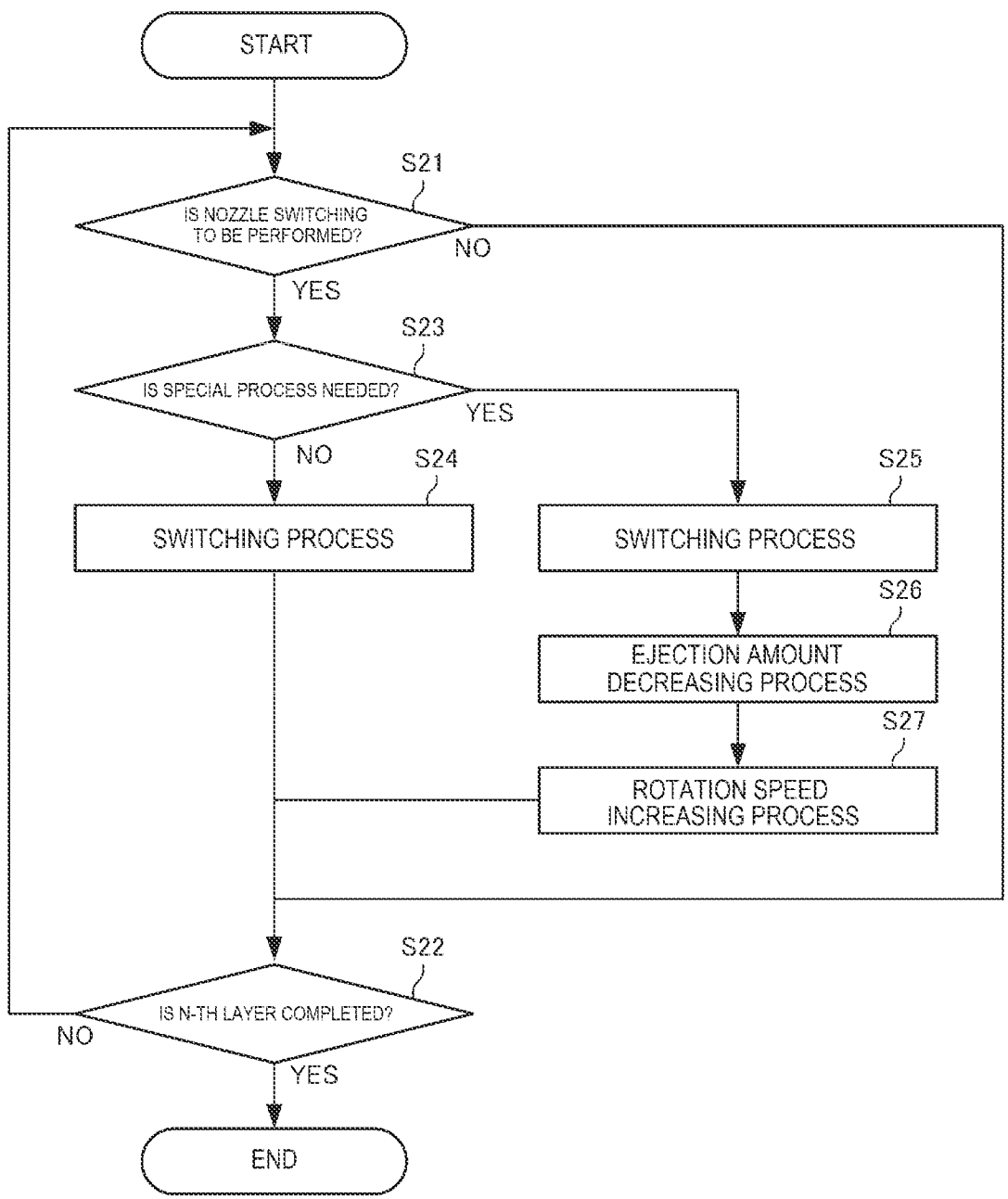
FIG. 12 is a flowchart for illustrating a shaped layer forming process of a control unit of a three-dimensional shaping apparatus according to a first modification of the present embodiment.

Next, a three-dimensional shaping apparatus according to a first modification of the present embodiment will be described with reference to the drawing. FIG. 12 is a flowchart for illustrating a shaped layer forming process of the control unit 40 of the three-dimensional shaping apparatus according to the first modification of the present embodiment.

Hereinafter, with respect to the three-dimensional shaping apparatus according to the first modification of the present embodiment, different points from the example of the three-dimensional shaping apparatus 100 according to the present embodiment described above will be described, and the description of the same matter will be omitted. The same shall apply to three-dimensional shaping apparatuses according to second and third modifications of the present embodiment shown below.

In the above-mentioned three-dimensional shaping apparatus 100, as shown in FIG. 11, the control unit 40 starts the ejection amount decreasing process of Step S15 before starting the switching process of Step S16.

On the other hand, in the three-dimensional shaping apparatus according to the first modification of the present embodiment, as shown in FIG. 12, the control unit 40 starts the ejection amount decreasing process of Step S26 after starting the switching process of Step S25. Therefore, as compared to a case where the ejection amount decreasing process is started before starting the switching process, for example, a period in which the rotation speed of the flat screw 130 is decreased can be shortened.

Steps S21 to S24 are the same as the above-mentioned Steps S11 to S14, respectively. Step S25 is the same as the above-mentioned Step S16. Step S26 is the same as the above-mentioned Step S15. Step S27 is the same as the above-mentioned Step S17.

2.2. Second Modification

Figure 13:
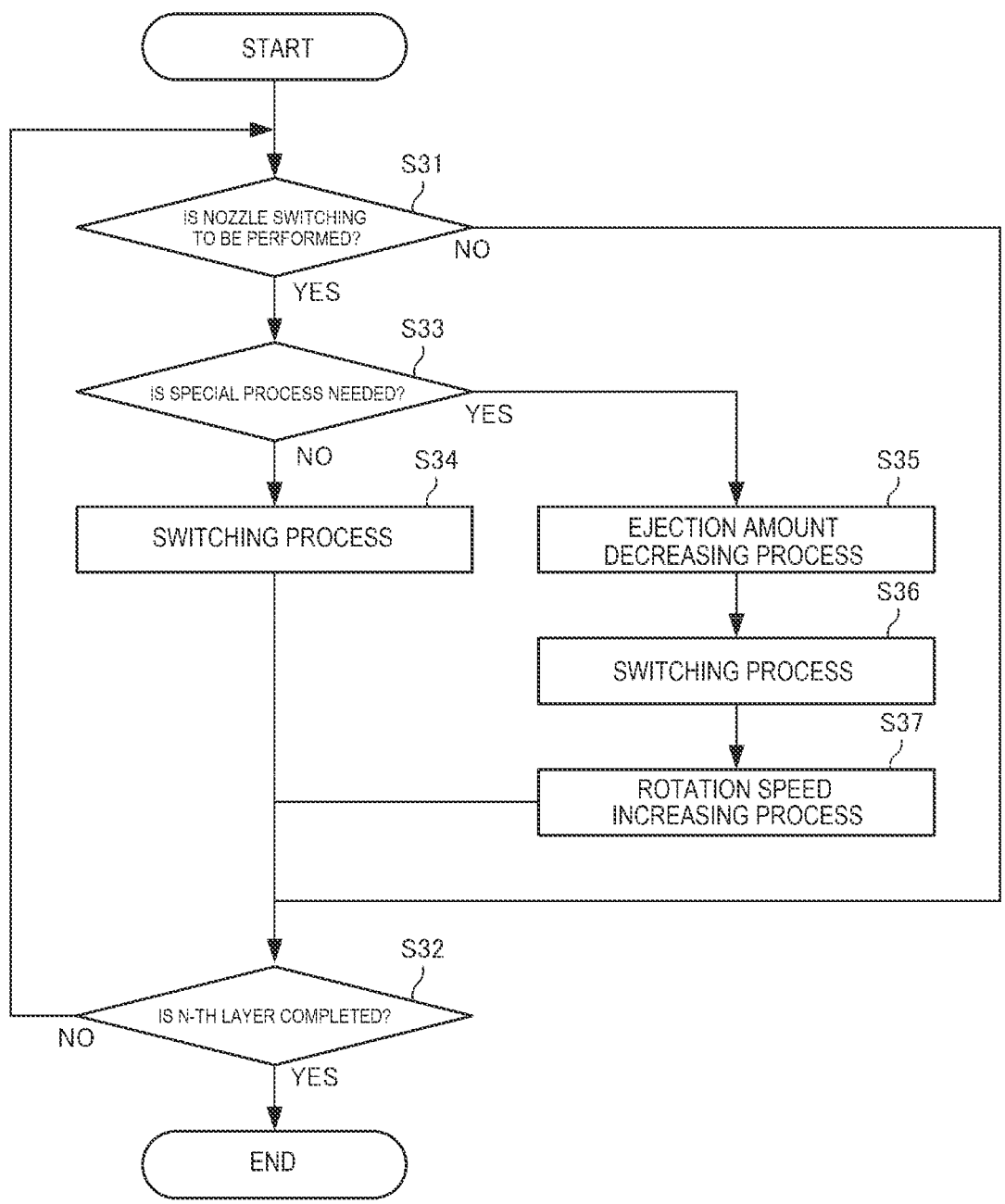
FIG. 13 is a flowchart for illustrating a shaped layer forming process of a control unit of a three-dimensional shaping apparatus according to a second modification of the present embodiment.

Next, a three-dimensional shaping apparatus according to a second modification of the present embodiment will be described with reference to the drawing. FIG. 13 is a flowchart for illustrating a shaped layer forming process of the control unit 40 of the three-dimensional shaping apparatus according to the second modification of the present embodiment.

In the above-mentioned three-dimensional shaping apparatus 100, as shown in FIG. 11, the control unit 40 decreases the rotation speed of the flat screw 130 in the ejection amount decreasing process of Step S15.

On the other hand, in the three-dimensional shaping apparatus according to the second modification of the present embodiment, as shown in FIG. 13, the control unit 40 decreases the ejection amount of the plasticized material from the second nozzle 164 to a first ejection amount from the ejection amount of the plasticized material from the second nozzle 164 before performing the ejection amount decreasing process by controlling the second ejection adjusting section 182 in the ejection amount decreasing process of Step S35. Specifically, the control unit 40 decreases the ejection amount of the plasticized material from the second nozzle 164 to the first ejection amount from the ejection amount in the first state by controlling the second driving mechanism 193. The second driving mechanism 193 may completely block the second flow channel 172 with the second rod pin 192 or may partially open the second flow channel 172.

The control unit 40 performs an ejection amount increasing process for increasing the ejection amount of the plasticized material from the second nozzle 164 to a second ejection amount from the first ejection amount by controlling the second ejection adjusting section 182 as Step S37 after switching from the first state to the second state. Specifically, the control unit 40 increases the ejection amount of the plasticized material from the second nozzle 164 to the second ejection amount from the first ejection amount by controlling the second driving mechanism 193. The second driving mechanism 193, for example, completely opens the second flow channel 172 by moving the second rod pin 192.

Steps S31 to S34 are the same as the above-mentioned Steps S11 to S14, respectively. Step S36 is the same as the above-mentioned Step S16.

When the ejection section has three or more nozzles and it is determined that a special process is needed, the ejection amount decreasing process and the ejection amount increasing process are performed for the ejection adjusting section corresponding to at least one nozzle among the nozzles that remain on before and after nozzle switching.

In the three-dimensional shaping apparatus according to the second modification of the present embodiment, the control unit 40 decreases the ejection amount of the plasticized material from the second nozzle 164 to the first ejection amount from the ejection amount before performing the ejection amount decreasing process by controlling the second ejection adjusting section 182 in the ejection amount decreasing process, and the control unit performs the ejection amount increasing process for increasing the ejection amount to the second ejection amount from the first ejection amount by controlling the second ejection adjusting section 182 after switching from the first state to the second state. Therefore, the ejection amount of the plasticized material from the second nozzle 164 can be decreased without decreasing the rotation speed of the flat screw 130.

2.3. Third Modification

Next, a three-dimensional shaping apparatus according to a third modification of the present embodiment will be described. In the above-mentioned three-dimensional shaping apparatus 100, an ABS resin is used as the material for shaping a three-dimensional shaped article.

On the other hand, in the three-dimensional shaping apparatus according to the third modification of the present embodiment, as the material for shaping a three-dimensional shaped article, for example, a material using any of various materials such as a material having thermoplasticity other than ABS, a metal material, and a ceramic material as a main material can be exemplified. Here, the "main material" means a material serving as a main component for forming the shape of the three-dimensional shaped article and refers to a material whose content ratio is 50 mass % or more in the three-dimensional shaped article. In the above-mentioned material, a material obtained by melting such a main material singly, and a material formed into a paste by melting some components contained together with the main material are included.

As the material having thermoplasticity, for example, a thermoplastic resin can be used. Examples of the thermoplastic resin include polypropylene (PP), polyethylene (PE), polyacetal (POM), polyvinyl chloride (PVC), polyamide (PA), polylactic acid (PLA), polyphenylene sulfide (PPS), polycarbonate (PC), modified polyphenylene ether, polybutylene terephthalate, polyethylene terephthalate, polysulfone, polyethersulfone, polyarylate, polyimide, polyamideimide, polyetherimide, and polyether ether ketone (PEEK).

In the material having thermoplasticity, a pigment, a metal, a ceramic, or other than these, an additive such as a wax, a flame retardant, an antioxidant, or a heat stabilizer, or the like may be mixed. The material having thermoplasticity is plasticized and converted into a molten state by rotation of the flat screw 130 and heating by the heating section 150 in the plasticizing section 120. Further, the plasticized material formed in this manner is hardened by decreasing the temperature after being ejected from the nozzles 162, 164, 166, and 168. The material having thermoplasticity is desirably ejected from the nozzles 162, 164, 166, and 168 in a completely molten state by being heated to a temperature equal to or higher than the glass transition point thereof.

In the plasticizing section 120, in place of the above-mentioned material having thermoplasticity, for example, a metal material may be used as the main material. In this case, it is desirable that a component that melts when forming the plasticized material is mixed in a powder material obtained by pulverizing the metal material, and the resulting material is fed to the plasticizing section 120.

Examples of the metal material include single metals of magnesium (Mg), iron (Fe), cobalt (Co), chromium (Cr), aluminum (Al), titanium (Ti), copper (Cu), and nickel (Ni), or alloys containing one or more of these metals, and a maraging steel, a stainless steel, cobalt-chromium-molybdenum, a titanium alloy, a nickel alloy, an aluminum alloy, a cobalt alloy, and a cobalt-chromium alloy.

In the plasticizing section 120, in place of the above-mentioned metal material, a ceramic material can be used as the main material. Examples of the ceramic material include oxide ceramics such as silicon dioxide, titanium dioxide, aluminum oxide, and zirconium oxide, and non-oxide ceramics such as aluminum nitride.

The powder material of the metal material or the ceramic material to be fed to the material feeding section 110 may be a mixed material obtained by mixing multiple types of single metal powders or alloy powders or ceramic material powders. Further, the powder material of the metal material or the ceramic material may be coated with, for example, any of the above-mentioned thermoplastic resins or any other thermoplastic resin. In this case, the material may be configured to exhibit fluidity by melting the thermoplastic resin in the plasticizing section 120.

To the powder material of the metal material or the ceramic material to be fed to the material feeding section 110, for example, a solvent can also be added. Examples of the solvent include water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetra-alkyl ammonium acetates; sulfoxide-based solvents such as dimethyl sulfoxide and diethyl sulfoxide; pyridine-based solvents such as pyridine, γ-picoline, and 2,6-lutidine; tetra-alkyl ammonium acetates (for example, tetra-butyl ammonium acetate, etc.); and ionic liquids such as butyl carbitol acetate.

In addition thereto, for example, a binder may also be added to the powder material of the metal material or the ceramic material to be fed to the material feeding section 110. Examples of the binder include an acrylic resin, an epoxy resin, a silicone resin, a cellulosic resin, or another synthetic resin, or PLA, PA, PPS, PEEK, and other thermoplastic resins.

3. Injection Molding Apparatus

In the above-mentioned embodiments, the three-dimensional shaping apparatus is illustrated, however, the present disclosure can not only be applied to the three-dimensional shaping apparatus, but also be applied to other apparatuses such as an injection molding apparatus. For example, in a case of an injection molding apparatus, the injection molding apparatus includes the above-mentioned shaping unit 10, a die in which a cavity space is formed, a die clamping section, and an injection control unit, and the injection control unit functions similarly to the control unit 40 of the three-dimensional shaping apparatus 100. The injection control unit executes a switching process for switching from a first state in which the ejection of the plasticized material to the cavity from the first nozzle 162 is stopped and the plasticized material is ejected to the cavity from the second nozzle 164 to a second state in which the plasticized material is ejected to the cavity from the first nozzle 162 and the second nozzle 164 by controlling the first ejection adjusting section 180 and the second ejection adjusting section 182, and an ejection amount decreasing process for decreasing the ejection amount of the plasticized material from the second nozzle 164 by controlling the screw or the second ejection adjusting section 182 before switching from the first state to the second state. Here, the screw refers to the flat screw 130 or an in-line screw.

The above-mentioned embodiments and modifications are examples and the present disclosure is not limited thereto. For example, it is also possible to appropriately combine the respective embodiments and the respective modifications.

The present disclosure includes substantially the same configuration, for example, a configuration having the same function, method, and result, or a configuration having the same object and effect as the configuration described in the embodiments. Further, the present disclosure includes a configuration in which a part that is not essential in the configuration described in the embodiments is substituted. Further, the present disclosure includes a configuration having the same operational effect as the configuration described in the embodiments, or a configuration capable of achieving the same object as the configuration described in the embodiments. In addition, the present disclosure includes a configuration in which a known technique is added to the configuration described in the embodiments.

From the above-mentioned embodiments, the following contents are derived.

One aspect of the three-dimensional shaping apparatus includes a plasticizing section that includes a screw and plasticizes a material by rotating the screw to form a plasticized material, a stage having a deposition face at which the plasticized material is deposited, an ejection section that ejects the plasticized material toward the deposition face, and has a first nozzle and a second nozzle, each of which communicates with the plasticizing section, a first ejection adjusting section that adjusts an ejection amount of the plasticized material from the first nozzle, a second ejection adjusting section that adjusts an ejection amount of the plasticized material from the second nozzle, a moving section that relatively moves the ejection section with respect to the stage along a first axis parallel to the deposition face, and a control unit that controls the plasticizing section, the first ejection adjusting section, and the second ejection adjusting section, in which the control unit performs a switching process for switching from a first state in which the ejection of the plasticized material from the first nozzle is stopped and the plasticized material is ejected from the second nozzle to a second state in which the plasticized material is ejected from the first nozzle and the second nozzle by controlling the first ejection adjusting section and the second ejection adjusting section, and an ejection amount decreasing process for decreasing the ejection amount of the plasticized material from the second nozzle by controlling the screw or the second ejection adjusting section before switching from the first state to the second state.

According to the three-dimensional shaping apparatus, the ejection responsiveness of the first nozzle can be improved.

In one aspect of the three-dimensional shaping apparatus, the control unit may rotate the screw by decreasing the rotation speed of the screw to a first rotation speed from the rotation speed of the screw before performing the ejection amount decreasing process in the ejection amount decreasing process, and the control unit may perform a rotation speed increasing process for rotating the screw by increasing the rotation speed to a second rotation speed from the first rotation speed after switching from the first state to the second state.

According to the three-dimensional shaping apparatus, the ejection amount of the plasticized material from the second nozzle can be returned to the ejection amount in the first state after switching from the first state to the second state.

In one aspect of the three-dimensional shaping apparatus, the control unit may start the ejection amount decreasing process after starting the switching process.

According to the three-dimensional shaping apparatus, as compared to a case where the ejection amount decreasing process is started before starting the switching process, for example, a period in which the rotation speed of the screw is decreased can be shortened.

In one aspect of the three-dimensional shaping apparatus, the control unit may start the ejection amount decreasing process before starting the switching process.

According to the three-dimensional shaping apparatus, as compared to a case where the ejection amount decreasing process is started after starting the switching process, the ejection amount decreasing process can be more reliably performed before switching from the first state to the second state.

In one aspect of the three-dimensional shaping apparatus, the control unit may stop the rotation of the screw in the ejection amount decreasing process, and the control unit may restart the rotation of the screw in the rotation speed increasing process.

According to the three-dimensional shaping apparatus, the ejection responsiveness of the first nozzle can be further improved.

In one aspect of the three-dimensional shaping apparatus, the control unit may decrease the ejection amount of the plasticized material from the second nozzle to a first ejection amount from the ejection amount before performing the ejection amount decreasing process by controlling the second ejection adjusting section in the ejection amount decreasing process, and the control unit may perform an ejection amount increasing process for increasing the ejection amount to a second ejection amount from the first ejection amount by controlling the second ejection adjusting section after switching from the first state to the second state.

According to the three-dimensional shaping apparatus, the ejection amount of the plasticized material from the second nozzle can be decreased without decreasing the rotation speed of the screw.

In one aspect of the three-dimensional shaping apparatus, the first nozzle and the second nozzle may be juxtaposed in a direction crossing the first axis.

According to the three-dimensional shaping apparatus, the shaping efficiency can be improved.

In one aspect of the three-dimensional shaping apparatus, the first ejection adjusting section may have a first rod pin that moves in a direction crossing a flowing direction of the plasticized material, and the second ejection adjusting section may have a second rod pin that moves in a direction crossing a flowing direction of the plasticized material.

According to the three-dimensional shaping apparatus, the distance between the first ejection adjusting section and the second ejection adjusting section can be decreased.

In one aspect of the three-dimensional shaping apparatus, the screw may be a flat screw having a grooved face with a groove formed therein, and the plasticizing section may include a barrel that has an opposed face opposed to the grooved face and that is provided with a communication hole communicating with the first nozzle and the second nozzle, and a heating section that heats the material between the screw and the barrel.

According to the three-dimensional shaping apparatus, as compared to a case where an in-line screw is used as the screw, miniaturization can be achieved.

In one aspect of the three-dimensional shaping apparatus, a first nozzle opening of the first nozzle and a second nozzle opening of the second nozzle may have a rectangular shape when viewed from a flowing direction of the plasticized material.

According to the three-dimensional shaping apparatus, a possibility of generating an unintended gap between the plasticized material ejected from the first nozzle and the plasticized material ejected from the second nozzle can be decreased.

One aspect of a three-dimensional shaped article production method is a three-dimensional shaped article production method for shaping a three-dimensional shaped article by plasticizing a material by rotating a screw so as to form a plasticized material in a plasticizing section, and ejecting the plasticized material toward a stage from a first nozzle and a second nozzle, each of which communicates with the plasticizing section, while relatively moving the first nozzle and the second nozzle with respect to the stage, and includes switching from a first state in which the ejection of the plasticized material from the first nozzle is stopped and the plasticized material is ejected from the second nozzle to a second state in which the plasticized material is ejected from the first nozzle and the second nozzle by controlling a first ejection adjusting section that adjusts an ejection amount of the plasticized material from the first nozzle and a second ejection adjusting section that adjusts an ejection amount of the plasticized material from the second nozzle; and decreasing the ejection amount of the plasticized material from the second nozzle by controlling the screw or the second ejection adjusting section before switching from the first state to the second state.

What is claimed is:

1. A three-dimensional shaping apparatus, comprising:
a plasticizing section that includes a screw and plasticizes a material by rotating the screw to form a plasticized material;
a stage having a deposition face at which the plasticized material is deposited;
an ejection section that ejects the plasticized material toward the deposition face, and has a first nozzle and a second nozzle, each of the first and second nozzles communicates with the plasticizing section;
a first ejection adjusting section that adjusts an ejection amount of the plasticized material from the first nozzle;
a second ejection adjusting section that adjusts an ejection amount of the plasticized material from the second nozzle;
a moving section that relatively moves the ejection section with respect to the stage along a first axis parallel to the deposition face; and
a processor that controls the plasticizing section, the first ejection adjusting section, and the second ejection adjusting section, wherein
the processor is configured to perform
a switching process, the switching process comprising switching from
a first state to a second state, wherein
in the first state, the first ejection adjusting section and the second ejection adjusting section are adjusted such that the ejection of the plasticized material from the first nozzle is stopped and the plasticized material is ejected from the second nozzle, and
in the second state, the first ejection adjusting section and the second ejection adjusting section are adjusted such that the plasticized material is ejected from the first nozzle and the second nozzle, and
an ejection amount decreasing process, occurring before switching from the first state to the second state, the ejection amount decreasing process comprising decreasing the ejection amount of the plasticized material from the second nozzle by controlling the screw or the second ejection adjusting section.

2. The three-dimensional shaping apparatus according to claim 1, wherein during the ejection amount decreasing process, the processor is configured to decrease a rotation of the screw to a first rotation speed, and
the processor is further configured to perform a rotation speed increasing process after switching from the first state to the second state, the rotation speed increasing process comprising increasing, from the first rotation speed, the rotation of the screw to a second rotation speed.

3. The three-dimensional shaping apparatus according to claim 2, wherein the processor is configured to stop the rotation of the screw in the ejection amount decreasing process, and
the processor is configured to restart the rotation of the screw in the rotation speed increasing process.

4. The three-dimensional shaping apparatus according to claim 1, wherein the processor is configured to, before performing the ejection amount decreasing process, decrease the ejection amount of the plasticized material from the second nozzle to a first ejection amount by controlling the second ejection adjusting section, and
the processor is configured to, after switching from the first state to the second state, perform an ejection amount increasing process that increases the first ejection amount to a second ejection amount by controlling the second ejection adjusting section.

5. The three-dimensional shaping apparatus according to claim 1, wherein the first nozzle and the second nozzle are juxtaposed in a direction crossing the first axis.

6. The three-dimensional shaping apparatus according to claim 1, wherein the first ejection adjusting section has a first rod pin that moves in a direction crossing a flowing direction of the plasticized material, and
the second ejection adjusting section has a second rod pin that moves in a direction crossing a flowing direction of the plasticized material.

7. The three-dimensional shaping apparatus according to claim 1, wherein the screw is a flat screw having a grooved face, the groove face comprising a groove, and
the plasticizing section includes
a barrel that has an opposed face opposed to the grooved face, the barrel is provided with a communication hole communicating with the first nozzle and the second nozzle, and
a heating section between the screw and the barrel.

8. The three-dimensional shaping apparatus according to claim 1, wherein a first nozzle opening of the first nozzle and a second nozzle opening of the second nozzle have a rectangular shape when viewed from a flowing direction of the plasticized material.

* * * * *